Figure 1:
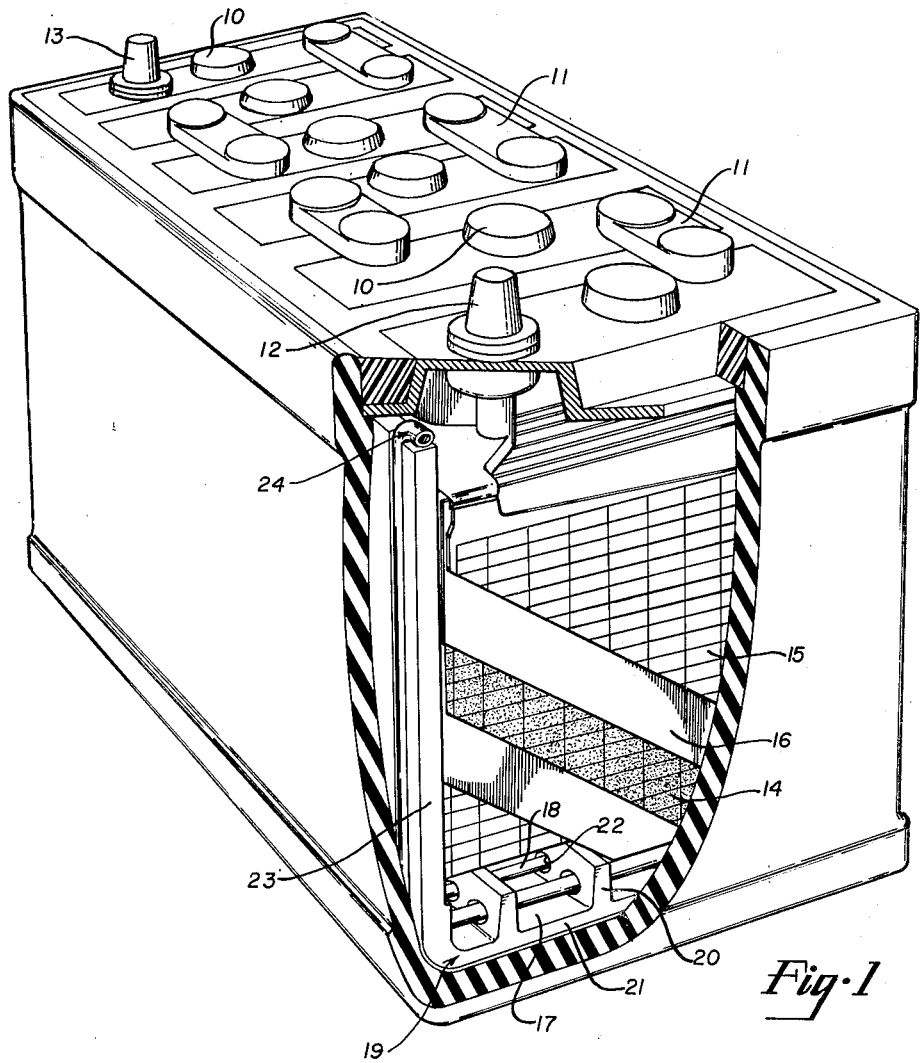

Aug. 28, 1956     N. H. KRAMER     2,761,006
BATTERY

Filed Sept. 10, 1952     2 Sheets-Sheet 1

INVENTOR.
NELSON H. KRAMER
BY *Fay & Fay*
ATTORNEYS

Aug. 28, 1956  N. H. KRAMER  2,761,006
BATTERY
Filed Sept. 10, 1952  2 Sheets-Sheet 2
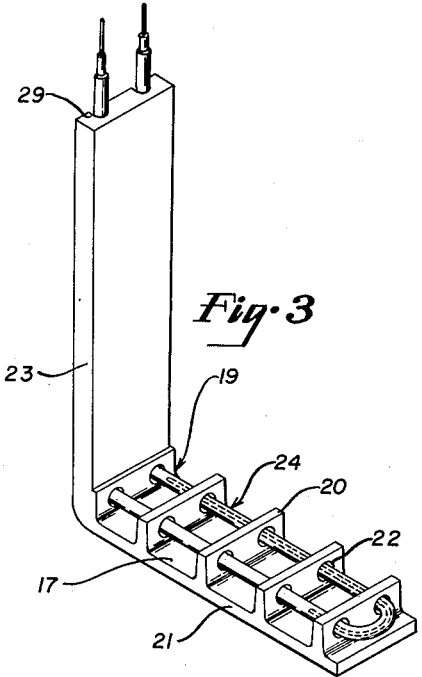
Fig·3
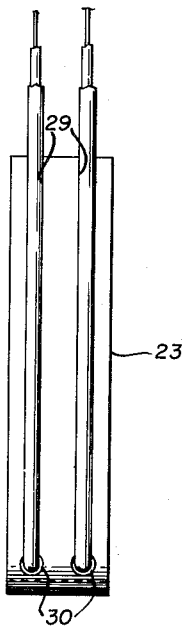
Fig·4
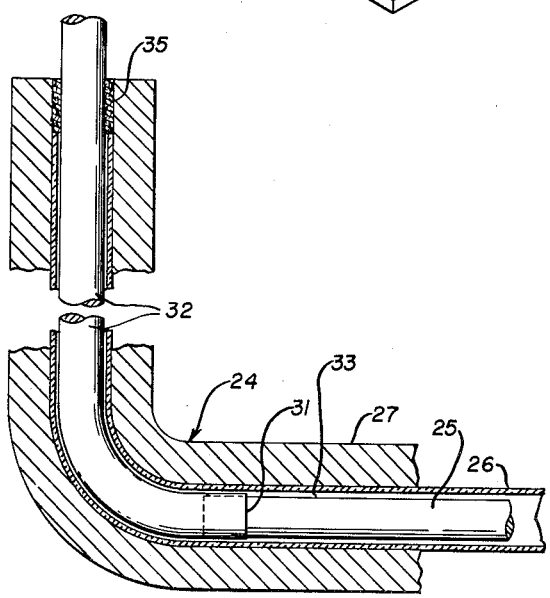
Fig·5
AVAILABLE CRANKING POWER
| | |
|---|---|
| 80°F. | 100 % |
| 32°F. | 65 % |
| 0°F. | 40 % |
| -40°F. | 18 % |
Fig·6
INVENTOR.
NELSON H. KRAMER
BY
Fay & Fay
ATTORNEYS

United States Patent Office 2,761,006
Patented Aug. 28, 1956

2,761,006

BATTERY

Nelson H. Kramer, Cleveland, Ohio

Application September 10, 1952, Serial No. 308,900

4 Claims. (Cl. 136—161)

The present invention relates, as indicated, to a cold weather battery, more particularly an electrically heated wet storage cell battery, and an electrical heating element and structure therefor.

The invention is further directed to the battery and its construction that particularly adapts it for a cold weather battery and to the heater element in and of itself.

This invention particularly relates to cold weather batteries adaptable to Arctic conditions, down to temperatures from 75 to 90° below zero F., but used more frequency at temperatures down to 40° below zero F., wherein available chemical energy of a fully charged battery is only a fraction of the total that is available if the temperature were at 80° F. even though fully charged in both instances. It is the purpose of this invention to make available this charge, which is only about 18%, and warm up the battery so that the greater portion of the charge will be available. This is, of course, necessary because wet storage cell batteries will not even take a charge below approximately zero ° F., and any residual power that may be left in the battery will soon be used up unless the battery is quickly re-heated to a temperature at which associated equipment may give it a charge.

This invention further relates to an electrical heater for a wet storage cell battery which will operate in sulphuric acid of battery electrolyte composition at ordinary and low temperatures and will rapidly provide heat to the electrolyte and resist the corrosive action of sulfuric acid.

In addition this invention relates to a battery of a particular structure which adapts it to a particular type lead-covered heater element of novel design placed in the battery in a specified position in the bottom, i. e. the sludge compartment thereof, and fixedly secured therein, where it cannot contact the plates and where any tendency to become a bipolar electrode will be decidedly reduced or entirely removed.

In present day vehicular equipment and power plants in Arctic regions, it is important that the associated equipment and accessories thereto be in full operating condition in a minimum of time. It is also understood that it is impossible to keep the equipment always at preferred operating temperatures, probably from 32° F. to 80° F. as the equipment must assume the ambient temperatures which are in the neighborhood at the worst season of 40° below to 90° below zero ° F. At these temperatures the electrolyte in a wet storage cell battery freezes in a jelled condition, and further, the battery will not accept a charge until the temperature reaches at least zero ° F. and preferable 30° F. Under these conditions warmup times are as much as 1½ hours to 2 hours to provide heat through the heavy rubber cases of the battery and permit the electrolyte to become a liquid again. In order not to waste time in warming up, a novel type of heater has been designed and placed in the battery in a convenient manner, making a new battery-heater combination. Under these severe conditions some means is frequently available for starting the engines and generating equipment of a vehicle or power plant, but no means is provided for bringing the battery up to temperature where it can be used for the auxiliary equipment connected to the battery. To warm up the battery quickly and efficiently the heaters must be internally thereof. It is in this way that the time for warm-up can be reduced to 15 to 30 minutes. It is important to do this because the battery as an operating element in the vehicle or power plant must accept a charge and provide power to the associated electrical equipment, which is frequently connected to the battery. The severe current drain of accessories added to vehicles and power plants is such that a battery would be pulled down in the matter of seconds if it were not able to accept a charge in a very short warm-up period. This reduces the efficiency of the equipment and its ready use, which is often important under these severe temperature conditions.

It may be seen that in connection with cold weather vehicles and batteries the fraction of power which is available at successively lower temperatures, reduces rapidly below zero F. For example, taking a fully charged battery at 80° F. of either the 45 or 100 ampere-type, the percentage of power which is available is 80% at 50° F., 65° at 32° F., 40% at zero F., and 18% at —40° F., while at —90° F. a fully charged battery has none of its power available. If, however, the same battery is re-heated the power will again become available, provided no damage is caused to the battery.

A particular difficulty which occurs in connection with wet storage cell batteries which are subjected to low temperatures during complete discharge, and are subsequently reheated, possibly by internal heating, is that of treeing. Treeing is a shortening of the plates of the battery through the separator. It frequently occurs in batteries which must stand in a fully discharged condition a very long time. With internal heaters and at low temperatures, the variations in temperature seem to accelerate the process and is believed to occur as follows:

When the battery is completely discharged, chemical action occurs in the battery so that the acid goes into plates of the battery to form lead sulphate and the electrolyte in the battery is of reduced acid concentration. This is particularly so in the vicinity of the plates and at this point the solubility of lead sulphate is increased, approaching pure water conditions. When the battery is again charged, or attempted to be charged, the lead sulphate in solution is reduced, lead crystals form and deposit in the separators and on the separators and cause an electrical short to be formed between the plates of the battery. The phenomena of treeing appears to be accentuated by changes in temperature. The battery is, of course, ruined and nothing can be done except to replace it.

An object of this invention is to produce an improved electrically heated wet storage cell battery.

A further object of my invention is to produce a novel type electrical heating element for corrosive liquids, particularly sulphuric acid in both dilute and concentrated conditions.

A further object of my invention is to produce an electrical heating element for wet storage cell batteries and the means for securing said heater in a wet storage battery cell.

To the accomplishment of the foregoing and related ends, said invention, then consists of the means hereinafter fully described and particularly pointed out in the claims; the annexed drawing and the following description setting forth in detail certain mechanism embodying the invention, such disclosed means constituting, however, but one of the various mechanical forms in which the principal of the invention may be used.

Figure 2:
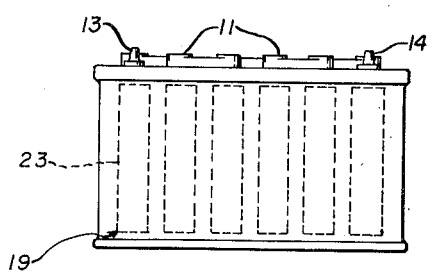

In the drawings,

Fig. 1 is a cut-away plan view of a battery showing my new and improved heater element therein, Fig. 2 is a side view of the battery showing the arrangement of heater elements in the cells of the battery, Fig. 3 is a plan view of my skeletonized support and heater elements adapted to be inserted in the wet storage cell battery, Fig. 4 is a rear view of said support member, Fig. 5 is a cross section of the heater element, and Fig. 6 is a diagrammatic view of the available cranking power from a fully charged battery at 80°, 32°, 0° F. and −40° F.

In the drawings Fig. 1 is a partial plan view of a battery, cut away to show the interior construction, illustrating the top arrangement with the usual filler caps 10, connector bars 11 and posts 12 and 13 respectively connecting as they are to positive and negative plates. Said positive and negative plates 14 and 15 respectively are separated by separators 16 of wood or plastic material, which are porous. In the sludge compartment 17 of the battery, a heater 18 and heater support shown generally at 19 is placed, and in its simplest embodiment it consists of a plurality of bottom rest members 20 attached by interconnecting means 21 having apertures 22 therethrough. A vertical support member is attached to said connection means 21 to form an L-shaped skeletonized bottom rest 23 which provides sealing for heater elements 24. Preferably the skeletonized bottom rest 23 is formed of an acid resistant, non-metallic material, such as hard rubber or other plastic. Thus in essence the heaters carry current down the side of a cell of a battery of either three or six cells type, though 6 cells are shown, into the bottom sludge compartment 17 where ribs corresponding to rest members 20 have been removed from an ordinary battery case for said skeletonized support member 21. The heaters pass through the rest members 20 by apertures therein 22, extending for the full length of the cell.

In Fig. 5 said heater consists of a high resistance alloy preferably Nichrome 25, about .040 inch in thickness surrounded by a layer of porous isolating material such as glass fibers or loom 26 about .006 to .012 inch in thickness, and an outer lead covering of lead 27, without substantial impurities, about .050 to .055 inch in thickness. Said lead is then capable of resisting the corrosive action of sulphuric acid either in concentrated or dilute solution. In a wet storage cell battery it may be seen that from the discharged to the charged condition the concentration of the sulphuric acid changes gradually in making this chemical change. By this means it may be seen that the lead covering must be capable of resisting attack by the sulphuric acid under both of these conditions in order that the lead covering may be impervious to the sulphuric acid.

Fig. 2 shows a side elevation of this new skeletonized support 23 for a standard wet storage cell battery, and it may be seen that it extends up above the normal level of the electrolyte and down one side of the cell to the bottom compartment. The battery would be made, of course, by omitting from an ordinary battery case the bottom ribs so that the heater element and supports could fit in said compartment, and take the place of the customary bottom ribs.

Fig. 3 shows a perspective view of the skeletonized support 23 adapted to be placed in the heater compartment and it basically consists of a plurality of rest members 20 and a vertical member. Said vertical member has cut from the rear thereof two vertical slots 29, into which said heater elements fit. At the junction of the vertical and horizontal members there are apertures 30 therethrough, to permit the heater element to extend into the vertical section. In this manner the heater is rigidly confined in the space below the battery and may not warp out of place and contact the plates, creating a short in the battery.

Fig. 4 is a rear view of said vertical slots 29 showing how they are connected and placed therein in grooves on the rear side of the vertical member of the skeletonized body rest 23.

Fig. 5 is a longitudinal cross section of the heater 24 and its connecting means, consisting of a high resistance alloy 25 such as Nichrome, having glass loom 26 covering and a sheathing tube 27 surrounding said glass loom and Nichrome. The sheathing or tube 27 is formed of an impervious metal which is not subject to corrosive attack by the battery electrolyte in which it is to be immersed. In the case of a lead acid battery the tube 27 is a thick chemically pure lead covering which surrounds the heater 24 and the layer of porous isolating material 26. The Nichrome is inserted at point 31 to a copper conductor wire 32 in said heater element by drilling the copper conductor wire, which is slightly larger than the Nichrome, fitting the Nichrome therein, and silver soldering the Nichrome to the copper wire. All of this is then encased in the glass loom 26 and subsequently in the lead as by pulling both members through the lead tubing. The glass loom 26 serves as an electric insulator which prevents contact of the tube 27 and the heater 24. At the same time the glass loom 26 is sufficiently porous to permit heat to be readily transmitted to the tube. In view of the porosity of the glass loom it will be seen that there will be a certain looseness shown at 33 in the construction which will have air containing oxygen in the area which might burn out the Nichrome wire. In order to prevent this I plan to encase the elements in an inert gas so that it will prevent oxidation of the heater wire. In order to seal these members from the air and the sulphuric acid of the battery cells I plan to hermetically seal and insulate the copper conductor wire from the lead tubing by an insulating compound 35 at the top of the cells.

Of course it should be understood that the heater elements are connected from one to another and to terminals on the battery case. The lead sheathing, however, is not continuous from cell to cell.

In the specific design of the heater I find that this construction provides for extremely long life in the heater element, as well as resistance to the corrosion of sulphuric acid in its varying concentrations and secure placement in the support member so that it will not become a bipolar electrode and perhaps become spongy and porous. Because it is securely fastened through openings 22 in the rest members 20 it cannot warp out of shape and approach the plates of the battery. It is spaced from the bottom of the sludge compartment 17 and transmits heat upward into the electrolyte of the battery. In this manner a large quantity of heat may be placed into the battery to warm the electrolyte thereof. This is particularly useful in Arctic conditions to make the power of the battery available and prevent the accessories of a power plant or vehicular equipment from draining the battery. Subsequently, of course, I will recharge the battery from an internal combustion engine driven generator but there must be a reservoir of power to supply these needs. In Fig. 6 I have shown how the cranking power of a battery drops with temperature in the Arctic temperature under consideration. It is to make more of the power available that this heater and battery combination is employed.

As an example of this heater and battery combination for a six cell battery of about 45 ampere hour capacity that gives about 12 volts which in some instances may be used with another battery in series and charged by a 28-volt generator, I have used this voltage across the terminals of the six cell heaters in each battery connected in series, so as to obtain a heat input of about 100 watts per cell using 21.5 amperes of current. A suitable sized heating element consists of a Nichrome wire about 5 inches long placed in the heater in the sludge compartment of the battery as previously described. The thickness of this heater would be in this specific case about .036 inch in diameter. Glass loom loosely surrounds the heater and the slightly enlarged copper leads connecting said heater. This glass loom may be of a thickness from .006 to .012 inch, though I prefer the lower range. Lead tubing of substantially pure lead known as chemical lead 99.90% pure is used with a wall thickness of .050 and an internal diameter slightly larger than the other components to provide a close, but not compression, fit. In this example it may be seen that there is about 2.2 watts of heating energy per ampere hour of cell capacity, or about 2.9 watts per cubic inch of electrolyte for a standard 45 ampere cell. Using these proportions, which are applicable to larger or smaller cells, the temperature of batteries comprising such cells may be raised almost 100° F. within 20 minutes.

I wish it to be understood that I do not confine myself to the precise details herein set forth in the preferred manner of carrying out my invention as it is apparent that many changes and variations may be made by those skilled in the art without departing from the spirit of the invention or exceeding the scope of the appended claims.

I claim:

1. In a wet storage cell battery combination of the lead acid type having at least one cell as well as electrolyte for said battery, the heating element comprising a high resistance alloy wire heater element and electrolyte impervious metallic sheathing of lead encasing said heater to prevent contact of battery electrolyte therewith and to conduct the heat generated by the heater to the electrolyte, and a layer of insulating fibers interposed between the heater and the sheathing, said sheathing being in a close but not compression fit, and sealing means at the ends of the heater to hermetically seal the sheathing from the wire to prevent contamination of the insulating fiber.

2. The wet storage cell battery of claim 1 in which the layer of insulating fibers is composed of glass fibers.

3. The wet storage cell battery of claim 1 in which the energy capacity of said heater is about 2.2 watts per ampere hour of capacity, or 2.9 watts per cubic inch of electrolyte, whereby the temperature of the cells may be raised about 100° F. within 20 minutes.

4. The wet storage cell battery of claim 1 in which the heating elements of a high resistance Nichrome alloy are about .040" in thickness and the insulating fiber layer is about .006" to .012" in thickness, and the lead is about .050" in thickness.

References Cited in the file of this patent

UNITED STATES PATENTS

| | | |
|---|---|---|
| 732,616 | Burgess et al. | June 30, 1903 |
| 1,793,829 | Richardson et al. | Feb. 24, 1931 |
| 2,157,139 | Mirick | May 9, 1939 |
| 2,387,829 | Burnham et al. | Oct. 30, 1945 |
| 2,418,792 | Riggs | Apr. 8, 1947 |
| 2,516,048 | Endress | July 18, 1950 |
| 2,615,933 | Carlson et al. | Oct. 28, 1952 |
| 2,626,971 | Mansoff | Jan. 27, 1953 |
| 2,700,064 | Akerman | Jan. 18, 1955 |

FOREIGN PATENTS

| | | |
|---|---|---|
| 57,725 | Norway | Mar. 15, 1937 |
| 62,194 | Norway | Mar. 18, 1940 |